United States Patent
Yu et al.

(10) Patent No.: US 8,948,148 B2
(45) Date of Patent: Feb. 3, 2015

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Hee-Jung Yu, Daejeon (KR); Min-Ho Cheong, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 27 days.

(21) Appl. No.: 13/654,359

(22) Filed: Oct. 17, 2012

(65) Prior Publication Data

US 2013/0136097 A1    May 30, 2013

(30) Foreign Application Priority Data

Oct. 17, 2011 (KR) .................. 10-2011-0106082
Nov. 28, 2011 (KR) .................. 10-2011-0125327
Oct. 16, 2012 (KR) .................. 10-2012-0114821

(51) Int. Cl.
*H04W 4/00* (2009.01)
*H04B 7/00* (2006.01)
*H04W 72/04* (2009.01)
*H04W 72/12* (2009.01)
*H04W 74/08* (2009.01)

(52) U.S. Cl.
CPC .......... *H04W 72/044* (2013.01); *H04W 72/121* (2013.01); *H04W 74/0808* (2013.01)
USPC .......................................... 370/338; 455/522

(58) Field of Classification Search
CPC .......... H04W 52/365; H04W 72/0433; H04W 72/121; H04B 7/26
USPC .......................................................... 370/330
See application file for complete search history.

(56) References Cited

U.S. PATENT DOCUMENTS

| | | | |
|---|---|---|---|
| 8,472,383 B1 * | 6/2013 | Banerjea et al. | 370/328 |
| 2006/0068820 A1 | 3/2006 | Sugaya et al. | |
| 2010/0165963 A1 | 7/2010 | Chu et al. | |
| 2010/0177756 A1 * | 7/2010 | Choi et al. | 370/338 |
| 2011/0093593 A1 | 4/2011 | Shirakata et al. | |
| 2013/0176986 A1 * | 7/2013 | YU et al. | 370/330 |

FOREIGN PATENT DOCUMENTS

| | | |
|---|---|---|
| KR | 1020090010523 A | 1/2009 |
| WO | WO 9638015 A1 * | 11/1996 |

* cited by examiner

*Primary Examiner* — Chi H Pham
*Assistant Examiner* — Voster Preval

(57) ABSTRACT

A data transmission apparatus in a communication system includes a reception unit configured to receive adjacent terminal information from a plurality of terminals through a new frequency band for transmission and reception of data between the terminals and one AP (access point); a verification unit configured to identify positions of the terminals within a service coverage of the AP through the adjacent terminal information, group the terminals into terminal groups through position-based grouping, and verify transmission possible times to the AP, in terminals included in the terminal groups; and a transmission unit configured to transmit the transmission possible times to the terminals included in the terminal groups through beacon frames in the AP, wherein, as the transmission possible times for the terminal groups, different time intervals are allocated in a beacon interval of the beacon frames.

20 Claims, 7 Drawing Sheets

APPARATUS AND METHOD FOR TRANSMITTING/RECEIVING DATA IN COMMUNICATION SYSTEM

CROSS-REFERENCES TO RELATED APPLICATIONS

The present application claims priorities of Korean Patent Application Nos. 10-2011-0106082, 10-2011-0125327, and 10-2012-0114821, filed on Oct. 17, 2011, Nov. 28, 2011, and Oct. 16, 2012, respectively, which are incorporated herein by reference in their entireties.

BACKGROUND OF THE INVENTION

1. Field of the Invention

Exemplary embodiments of the present invention relate to a communication system, and, more particularly, to an apparatus and a method for transmitting and receiving data in a communication system, in which one AP (access point) transmits and receives data to and from a plurality of terminals, that is, stations (STAs), while maintaining a service quality.

2. Description of Related Art

In a current communication system, research for providing various qualities of service (hereinafter, referred to as 'QoS') to users at a high transmission rate has been actively conducted. In a wireless local area network (hereinafter, referred to as 'WLAN') system as an example of such a communication system, research for methods for stably transmitting large data at a high speed through limited resources has been actively conducted. In particular, in a communication system, research for data transmission through wireless channels has been conducted. Recently, methods for the WLAN system to normally transmit and receive large data by effectively using limited wireless channels have been suggested.

Meanwhile, in a current communication system, in order to efficiently transmit larger capacity data, research for a new frequency band which is not used by legacy devices for data transmission and reception in an existing communication system has been conducted. In particular, research for data transmission and reception in such a new frequency band has been conducted.

However, in the current communication system, no concrete method for transmitting and receiving data in a new frequency band which is not used by the legacy devices band has been suggested. In particular, no concrete method for a frame for transmitting and receiving data in a new frequency band and no concrete method for normally transmitting and receiving data to and from a plurality of users have been suggested. In other words, no concrete method for one AP to normally transmit and receive data to and from a plurality of users, for example, terminals, in a new frequency band while maintaining a QoS has been suggested.

As a consequence, in order to stably transmit and receive data at a high speed through a new frequency band in a communication system, for example, a WLAN system, methods for configuring a frame in a new frequency band and normally transmitting and receiving large data to and from a plurality of users, for example, a plurality of terminals, through the frame in the new frequency band while maintaining a QoS are demanded in the art.

SUMMARY OF THE INVENTION

Embodiments of the present invention are directed to an apparatus and a method for transmitting and receiving data in a communication system.

Other embodiments of the present invention are directed to an apparatus and a method for configuring a frame in a new frequency band and stably transmitting and receiving data at a high speed in a communication system.

Other embodiments of the present invention are directed to an apparatus and a method for normally transmitting and receiving large data to and from a plurality of users, that is, a plurality of terminals, in a new frequency band while maintaining a service quality, in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data transmission apparatus in a communication system includes: a reception unit configured to receive adjacent terminal information from a plurality of terminals through a new frequency band for transmission and reception of data between the terminals and one AP (access point); a verification unit configured to identify positions of the terminals within a service coverage of the AP through the adjacent terminal information, group the terminals into terminal groups through position-based grouping, and verify transmission possible times to the AP, in terminals included in the terminal groups; and a transmission unit configured to transmit the transmission possible times to the terminals included in the terminal groups through beacon frames in the AP, wherein, as the transmission possible times for the terminal groups, different time intervals are allocated in a beacon interval of the beacon frames.

In accordance with another embodiment of the present invention, a data reception apparatus in a communication system includes: a generation unit configured to generate adjacent terminal information in a new frequency band for transmission and reception of data between a plurality of terminals and one AP (access point); a transmission unit configured to transmit the adjacent terminal information to the AP; and a reception unit configured to receive transmission possible times of terminal groups corresponding to the adjacent terminal information, through beacon frames in the AP, wherein, as the transmission possible times for the terminal groups, different time intervals are allocated in a beacon interval of the beacon frames, wherein the terminals of the terminal groups access the AP during the different time intervals, and transmit and receive data to and from the AP, and wherein terminals included in the same terminal group among the terminal groups make multiple accesses to the AP in a CSMA (carrier sense multiple access) scheme during a time interval which is allocated to the same terminal group, and transmit and receive data to and from the AP.

In accordance with another embodiment of the present invention, a data transmitting method in a communication system includes: receiving adjacent terminal information from a plurality of terminals through a new frequency band for transmission and reception of data between the terminals and one AP (access point); identifying positions of the terminals within a service coverage of the AP through the adjacent terminal information, grouping the terminals into terminal groups through position-based grouping, and verifying transmission possible times to the AP, in terminals included in the terminal groups; and transmitting the transmission possible times to the terminals included in the terminal groups through beacon frames in the AP, wherein, as the transmission possible times for the terminal groups, different time intervals are allocated in a beacon interval of the beacon frames.

In accordance with another embodiment of the present invention, a data receiving method in a communication system includes: generating adjacent terminal information in a new frequency band for transmission and reception of data between a plurality of terminals and one AP (access point); transmitting the adjacent terminal information to the AP; and receiving transmission possible times of terminal groups corresponding to the adjacent terminal information, through beacon frames in the AP, wherein, as the transmission possible times for the terminal groups, different time intervals are allocated in a beacon interval of the beacon frames, wherein the terminals of the terminal groups access the AP during the different time intervals, and transmit and receive data to and from the AP, and wherein terminals included in the same terminal group among the terminal groups make multiple accesses to the AP in a CSMA (carrier sense multiple access) scheme during a time interval which is allocated to the same terminal group, and transmit and receive data to and from the AP.

DESCRIPTION OF SPECIFIC EMBODIMENTS

Figure 1:
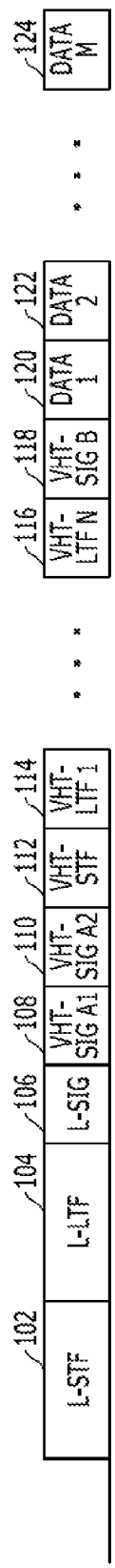
FIGS. 1 to 3 diagrams schematically showing the structures of a frame in a communication system in accordance with embodiments of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention suggests an apparatus and a method for transmitting and receiving data in a communication system, for example, a wireless local area network (hereinafter, referred to as 'WLAN') system. While the WLAN system will be exemplarily described in embodiments of the present invention, the apparatus and the method for transmitting and receiving data suggested in the present invention may be applied to other communication systems.

In a communication system, one AP (access point) normally transmits and receives large data to and from a plurality of terminals, for example, stations, while maintaining a service quality in terms of transmission delay, etc., in a new frequency band which is not used by the legacy devices for transmitting and receiving data in an existing system. In an embodiment of the present invention, by controlling an AP to provide a service to a plurality of terminals in a WLAN system, large data are normally transmitted and received to and from the plurality of terminals in a new frequency band, while maintaining various qualities of service (hereinafter, referred to as 'QoS'), and accordingly, it is possible to stably provide services of various QoS to the plurality of terminals, that is, a plurality of users.

A communication system in accordance with an embodiment of the present invention, for example, a WLAN system uses a wireless communication technology for providing a high speed data service in an unlicensed band. In particular, unlike an existing cellular system, only if an access point (hereinafter, referred to as 'AP') serving as a base station is power-connected with a wired network, the communication system may be easily installed even by any one and data communication may be performed at a low cost. The decentralized operation characteristic of such a WLAN system provides an advantage in that a simple operation is possible, and is extended up to a sensor network and a smart utility network. In this regard, while respective terminals do not transmit a large amount of data in an application such as the sensor network or the smart utility network, a service quality in terms of transmission delay, etc. is considered important and it is important for one AP to support a large number of terminals.

Moreover, in an embodiment of the present invention, a multiple access scheme is supported for a plurality of terminals in a WLAN system by using position-based grouping. After grouping the plurality of terminals through position-based grouping, beacon frames are transmitted and received to and from terminal groups of the terminals. In this regard, the WLAN system, which makes multiple accesses in a CSMA (carrier sense multiple access) scheme in which whether to make accesses is determined through carrier sensing, has an advantage in that simplicity is provided since no centralized management is needed. However, due to the characteristics of wireless channels, a problem is caused in terms of a hidden node. The hidden node problem becomes serious in outdoor communication circumstances with a wide service coverage.

According to this fact, in a communication system in accordance with an embodiment of the present invention, when a plurality of terminals initially access an AP, they transmit information such as addresses of adjacent terminals, reception power of signals received from the adjacent terminals, and so forth, that is, adjacent terminal information, to the AP. The AP groups the plurality of terminals such that geographically adjacent terminals can form terminal groups, allocates different accessible times to the respective terminal groups such that a collision does not occur among the terminal groups, and controls multiple accesses through competition in the CSMA scheme among adjacent terminals which are included in the same terminal group. Respective terminals transmit adjacent terminal information to be transmitted to the AP as described above, that is, address information of adjacent terminals and reception power information of signals received from adjacent terminals, by including the information in an association request frame or in the header of an MAC (media access control) layer of a data frame.

Meanwhile, in the WLAN system, in order to solve the above-described hidden node problem, data are transmitted after securing channels through transmission and reception of an RTS (request to send) frame and a CTS (clear to send) frame. Since the RTS frame and the CTS frame have relatively small amounts of information, the probability of a collision to occur is low in comparison with a data frame, and thus, it is possible to alleviate the hidden node problem. However, a limitation exists in completely solving the hidden node problem. In order to overcome such a limitation, in the WLAN system, a method has been proposed in which a threshold of the RTS frame and the CTS frame is preset such that, when an amount of data is larger than the preset threshold, data can be transmitted after securing channels through transmission and reception of the RTS frame and the CTS frame, and, when an amount of data is smaller than the preset threshold, a data frame can be transmitted without transmission and reception of the RTS frame and the CTS frame.

While such a method can relieve the hidden node problem through the RTS frame and the CTS frame in the case where the number of terminals is small as in a narrow area such as an indoor space, the hidden node problem may become serious in the case where a number of terminals access one AP as in outdoor circumstances. Therefore, in a communication system in accordance with an embodiment of the present invention, terminals which are positioned in a geographically adjacent area within a service coverage of an AP are grouped into one terminal group, and access try times are differently set among terminal groups which are geographically separated within the service coverage of the AP, such that the occurrence of a collision among the terminal groups is prevented and terminals included in the same terminal group are caused to try to make accesses during the same time interval, thereby solving the hidden node problem.

In other words, in the communication system in accordance with the embodiment of the present invention, in order to overcome a disadvantage caused due to the fact that, in the case where the WLAN system is used in outdoor circumstances and a plurality of antennas or an antenna with a high antenna gain is used or transmission power is increased in comparison with terminals to widen a service coverage of the WLAN system, the hidden node problem becomes more serious than in indoor circumstances and the probability of a collision to occur increases due to the hidden node problem, that is, in order to solve the above-described hidden node problem, adjacent terminal information is included in the frames which are transmitted by the plurality of terminals to the AP and is transmitted to the AP, and the AP groups geographically adjacent terminals into terminal groups within a service coverage of the AP by using the adjacent terminal information included in the frames and controls accesses to the AP among the terminal groups into which the plurality of terminals are grouped in this way. Namely, in the communication system in accordance with the embodiment of the present invention, in order to solve the above-described hidden node problem of the WLAN system, the AP groups the plurality of terminals into terminal groups by using the adjacent terminal information received from the plurality of terminals, and differently allocates access times to the AP by the terminal groups. Thus, in the communication system in accordance with the embodiment of the present invention, it is possible to prevent a network throughput from deteriorating due to the hidden node problem which becomes serious even in the case where the WLAN system is used outdoors.

Further, in a communication system in accordance with an embodiment of the present invention, in order to allow one AP to normally transmit and receive large data to and from a plurality of terminals through a new frequency band while maintaining a QoS, one physical AP operates as a plurality of APs, that is, one physical AP includes a plurality of virtual APs and performs the functions of a plurality of APs, thereby overcoming the disadvantages of the CSMA (carrier sense multiple access) scheme. The virtual APs included in one physical AP perform the same function as the AP, in particular, performs the function of administrating terminal groups for a plurality of terminals.

Also, in the CSMA scheme, in the case where a number of terminals are to transmit data at a certain time, as the terminals compete with one another to transmit data, it is difficult to meet a requirement for transmission delay, and at the worst, collision occurs among the data newly transmitted by the respective terminals and no terminals may transmit data. In other words, since the CSMA scheme has a decentralized operation characteristic in that the role of controlling accesses of terminals is not centrally performed, the terminals compete with one another to transmit data and a terminal which wins the competition transmits data, a limit exists in the number of terminals capable of being actually supported by one AP.

However, in a WLAN system which mainly uses a sensor network or a VoIP (voice over Internet protocol), while an amount of data to transmit is not substantial, a quality of service in terms of transmission delay should be satisfied, and simultaneous accesses of a number of terminals should be possible. Accordingly, in an embodiment of the present invention, in order to satisfy the quality of service and effectively support a number of terminals in the WLAN system as described above, an AP control scheme and a terminal access scheme are suggested. In the case where a number of terminals simultaneously access one AP and compete with one another to transmit data in the WLAN system, the probability of packets to collide in a wireless environment increases by the number of the terminals and a channel utilization efficiency markedly deteriorates, and in an extreme case, a situation may result in which packet collision continuously occurs and no terminals transmit data. In consideration of this fact, in the embodiment of the present invention, by applying TDMA (time division multiple access) to the CSMA scheme, even in the case where a plurality of terminals are to be simultaneously accessed, accesses of an AP and terminals are controlled so that the AP can transmit and receive data to and from the terminals.

In such a communication system in accordance with the embodiment of the present invention, wireless transmission in the new frequency band means wireless transmission in a frequency band which is different from the 2.4 GHz or 5 GHz band used in the existing WLAN system. Therefore, in the case where the frame structure of the IEEE 802.11ac system is used as it is in the embodiment of the present invention in which wireless transmission is implemented in the new frequency band, data processing rate is likely to deteriorate due to a substantial unnecessary overhead. For example, in the IEEE 802.11ac system, in order to maintain compatibility with the IEEE 802.11a system and the IEEE 802.11n system which are already defined in the same 5 GHz band, additional signals and information are included. However, in the case where the frame structure of the IEEE 802.11ac system is used in the new frequency band in accordance with the embodiment of the present invention, configuration of an efficient frame is possible because additional signals and information are not needed for such compatibility. Further, in the case where a new transmission scheme and a new data transmission rate are defined, bit allocation of control information may be changed.

In the frame structure of the above-described IEEE 802.11ac system, after a legacy short training field (L-STF), a legacy long training field (L-LTF) and a legacy signal field (L-SIG) are first defined in order for compatibility with the IEEE 802.11a system and the IEEE 802.11n system which use the same 5 GHz band, a very high throughput signal field (VHT-SIG) in which the control information of a frame actually used in the IEEE 802.11ac system is included, a very high throughput short training field (VHT-STF) for automatic gain control, a very high throughput long training field (VHT-LTF) for channel estimation, and a data field in which data to be actually transmitted are included, are defined.

The L-STF, L-LTF and L-SIG are fields which are defined for compatibility with the IEEE 802.11a system and the IEEE 802.11n system. Thus, in a system which does not use the 5 GHz band, the fields for the compatibility, that is, the L-STF, L-LTF and L-SIG, serve as unnecessary overheads. Hence, in the embodiment of the present invention, a novel frame structure, which reduces an overhead and includes new control information needed in a new system using a new frequency band, is configured.

The IEEE 802.11ac system enables data transmission of a G bps level while maintaining compatibility with the IEEE 802.11a system and the IEEE 802.11n system in the 5 GHz band. In particular, the IEEE 802.11ac system supports bandwidths of 20 MHz, 40 MHz, 80 MHz and 160 MHz, and transmits maximum 8 data streams using a multiple transmission and reception antenna technology, wherein data are transmitted by configuring a frame to maintain compatibility with other systems as described above. Hereinbelow, a frame structure in a communication system in accordance with an embodiment of the present invention will be described in detail with reference to FIGS. 1 to 3.

FIG. 1 is a diagram schematically showing a frame structure in a communication system in accordance with an embodiment of the present invention. FIG. 1 is a diagram schematically showing the frame structure of the IEEE 802.11ac system in the communication system in accordance with the embodiment of the present invention.

Referring to FIG. 1, a frame of the IEEE 802.11ac system includes control fields in which control information for data transmission to and from a plurality of terminals is included, that is, an L-STF 102, an L-LTF 104, an L-SIG 106, a VHT-SIG A1 108, a VHT-SIG A2 110, a VHT-STF 112, a plurality of VHT-LTFs, for example, a VHT-LTF 1 114 and a VHT-LTF N 116, and a VHT-SIG B 118, and includes a plurality of data fields as data fields in which data to be transmitted to the plurality of terminals are included, that is, a DATA 1 120, a DATA 2 122 and a DATA M 124.

The L-STF 102 is used in signal detection, automatic gain control, frequency error estimation, frame synchronization, and so forth, and the L-LTF 104 is used in channel estimation, frequency error estimation, and so forth. Also, the L-SIG 106 includes transmission rate information, frame length information, and so forth, and the VHT-SIG A1 108 and the VHT-SIG A2 110 include information such as band widths, guard interval lengths, space-time codes, transmission rates (MCS (modulation and coding scheme) levels), data stream numbers, AID information, a used coding technology, beamforming, and so forth.

The VHT-STF 112 is used in automatic gain control, and the VHT-LTF 1 114 and the VHT-LTF N 116 are used in channel estimation. The VHT-SIG B 118 includes transmission rates (MCS levels) by user, for multi-user MIMO (multi-input multi-output), data length information, and so forth, and the DATA 1 120, the DATA 2 122 and the DATA M 124 include data which are to be actually transmitted to users, that is, STAs (stations) as terminals.

The VHT-LTF 1 114 and the VHT-LTF N 116 are determined according to the number of data streams which are to be transmitted through the frame. For example, in the case where only one stream is transmitted, only the VHT-LTF 1 114, that is, one VHT-LTF is included in the frame, and, in the case where the number of streams is 2, the VHT-LTF 1 114 and a VHT-LTF 2, that is, two VHT-LTFs are included in the frame.

The transmission rate information and frame length information of the L-SIG 106 do not actually include the information of data, and causes data transmission not to be implemented during the length of a received frame in the case where the terminals of the IEEE 802.11a system or the IEEE 802.11n system receive the corresponding frame. The transmission rate information and frame length information of the L-SIG 106 become unnecessary information in the case where compatibility with the IEEE 802.11a system or the IEEE 802.11n system is not considered. The functions of the L-STF 102 and the L-LTF 104 may be replaced by the VHT-STF 112 and the VHT-LTFs 114 and 116. In the case where compatibility is not considered as described above, the frame structure of the IEEE 802.11ac system becomes an inefficient frame structure due to the presence of an overhead. A frame structure newly configured by removing such inefficiency will be described in detail with reference to FIG. 2.

Figure 2:

FIG. 2 is a diagram schematically showing a frame structure in a communication system in accordance with another embodiment of the present invention. FIG. 2 is a diagram showing a frame structure in which compatibility with the IEEE 802.11a system or the IEEE 802.11n system is not considered and an overhead is reduced from the frame structure of the IEEE 802.11ac system shown in FIG. 1, to improve efficiency. Also, FIG. 2 is a diagram showing a new frame structure in a new frequency band in a communication system in accordance with another embodiment of the present invention, which is different from a frequency band used for transmitting and receiving data in an existing system.

Referring to FIG. 2, a frame in the new frequency band includes control fields in which control information for data transmission to and from a plurality of terminals is included, that is, a VHT-STF 202, a VHT-SIG A1 206, a VHT-SIG A2 208, a plurality of VHT-LTFs, for example, a VHT-LTF 1 204, a VHT-LTF 2 210 and a VHT-LTF N 212, and a VHT-SIG B 214, and includes a plurality of data fields as data fields in which data to be transmitted to the plurality of terminals are included, that is, a DATA 1 216, a DATA 2 218 and a DATA M 220.

The VHT-STF 202 is used in signal detection, automatic gain control, frequency error estimation, frame synchronization, and so forth, and the VHT-LTF 1 204 is used in channel estimation, frequency error estimation, and so forth. Also, the VHT-SIG A1 206 and the VHT-SIG A2 208 include information such as band widths, guard interval lengths, space-time codes, transmission rates (MCS levels), data stream numbers, AID information, a used coding technology, beamforming, application of a new transmission mode, and so forth.

Not only the VHT-LTF 1 204 but also the VHT-LTF 2 210 and the VHT-LTF N 212 are used in channel estimation, and the VHT-SIG B 214 includes transmission rates (MCS levels) by user, for multi-user MIMO, data length information, and so forth. The DATA 1 216, the DATA 2 218 and the DATA M 220 include data which are to be actually transmitted to users, that is, STAs as terminals.

In the communication system in accordance with the embodiment of the present invention, in order to transmit data using the frame in the new frequency band, the VHT-STF 202 is extended by the length of the L-STF 102 in the above-described frame of the IEEE 802.11ac system, and performs the function performed by the L-STF 102. Among the VHT-LTFs 204, 210 and 212, the VHT-LTF 1 204 as a first long training field is preferentially arranged at the front portion of the frame, that is, next to the VHT-STF 202, and the remaining N−1 number of VHT-LTFs 210 and 212 are arranged after the VHT-SIG A1 206 and the VHT-SIG A2 208. Control information for the frame which all terminals should receive is included in the VHT-SIG A1 206 and the VHT-SIG A2 208.

In the case where the communication system, which transmits and receives data using such frame in the new frequency band, supports a multi-user MIMO function, the VHT-SIG B 214, which includes the transmission rate information by user and the data length information, should be included in the frame structure in the new frequency band. In the case where the communication system does not support the multi-user MIMO function, the VHT-SIG B 214 may be omitted from the frame.

The structures of the VHT-SIG A1 206 and the VHT-SIG A2 208 are as given in Table 1.

TABLE 1

| | | | | |
|---|---|---|---|---|
| VHT-SIG A1 | B0-B1 | Bandwidth | 2-bit | Denoting 20/40/80/160 MHz by 0/1/2/3, respectively. |
| | B3 | Reservation | 1-bit | Fixing to 1 |
| | B4-B9 | Group ID | 6-bit | Including group ID information |
| | B10-21 | Nsts | 12-bit | In the case of a multi-user, denoting the numbers of streams of 4 users to 0 to 4, by 3 bits for each user In the case of a single user, denoting 1(000) to 8(111) streams by B10 to B12, B13 to B21 including partial AID information |
| | B22 | TXOP_PS_NOT_ALLOWED | 1-bit | Indicating whether TXOP_PS can be utilized or not |
| | B23 | Reservation | 1-bit | Fixing to 1 |
| VHT-SIG A2 | B0-B1 | Short GI | 2-bit | Setting according to whether short GI is used or not |
| | B2-B3 | Coding scheme (coding) | 2-bit | Indicating whether LDPC and BCC are used or not |
| | B4-B7 | Transmission rate (MCS) | 4-bit | Defining 10 MCSs from BPSK 1/2 code rate to 256-QAM 5/6 code rate |
| | B8 | Beamforming | 1-bit | Indicating whether beamforming is used or not |
| | B9 | Reservation | 1-bit | Fixing to 1 |
| | B10-B17 | CRC | 8-bit | Inserting CRC bit |
| | B18-B23 | Tail | 6-bit | For tailing trellis of Viterbi decoder |

In Table 1, in the case where the number of possible bandwidths (BWs) of the communication system in accordance with the embodiment of the present invention as shown in FIG. 2, which uses the frame structure in the new frequency band, is at least 4, the region B3 of the VHT-SIG A1 206 may be additionally utilized for bandwidth information in consideration of the cases where a bandwidth is equal to or larger than 20 MHz, 40 MHz, 80 MHz and 160 MHz, for example. In the case of Nsts which denotes the number of space-time transmission streams in the VHT-SIG A1 206, maximum 4 streams are allocated to 4 users for a multi-user, and, in the case of a single user, maximum 8 streams may be allocated. In the communication system in accordance with the embodiment of the present invention as shown in FIG. 2, which uses the frame structure in the new frequency band, as can be readily seen from above descriptions, each of the numbers of streams to be allocated is decreased to a half to secure a margin of 1 bit, and the 1 bit secured in this way may be allocated to a new transmission scheme.

That is to say, in the communication system in accordance with the embodiment of the present invention as shown in FIG. 2, which uses the frame structure in the new frequency band, a transmission rate is decreased to a half through repetitive transmission and the like when compared to a conventional system, and 1 bit may be allocated to define a mode capable of increasing a communication distance.

Therefore, in the communication system in accordance with the embodiment of the present invention, 3 bits are allocated to each user in the case of a multi-user, wherein 1 bit of the 3 bits is allocated as a bit for indicating whether or not to perform repetitive transmission, and the remaining 2 bits denote the number of transmission streams. Furthermore, in the communication system in accordance with the embodiment of the present invention, even in the case of a single user, 1 bit is used to indicate whether or not to perform repetitive transmission, the remaining 2 bits define 1 to 4 transmission streams, and, in the case where an additional transmission mode is further needed, the additional transmission mode may be used by using other reserved bits.

For example, in the communication system in accordance with the embodiment of the present invention, in the case where up to a 4× repetitive transmission mode or a 6× repetitive transmission mode is defined to further extend a communication distance, up to the region B23 of the VHT-SIG A1 206 or the region B9 of the VHT-SIG A2 208 is utilized in defining a new mode. Moreover, in the communication system in accordance with the embodiment of the present invention, in the case where a mode for extending a communication distance by increasing a reception sensitivity as in repetitive transmission is used, the VHT-STF 202 and the VHT-LTFs 204, 210 and 212 are used by being extended in the lengths thereof to improve performance of initial signal detection and channel estimation. The extended VHT-LTFs 204, 210 and 212 have the same structure as an existing OFDM (orthogonal frequency division multiplexing) symbol. In the case where the VHT-LTFs 204, 210 and 212 are not extended, they have the structure of DGI (double GI (guard interval))+LTF+LTF as in the L-LTF 104, and, in the case where the VHT-LTFs 204, 210 and 212 are extended, extension is made by increasing the number of the structures of GI+LTF which are added next to the structure of DGI+LTF+LTF.

For the sake of convenience in explanation, it is assumed that, in the basic structures of the VHT-SIG A1 206 and the VHT-SIG A2 208, 52 data subcarriers, which remain by excluding guard band, DC (direct current) and pilot subcarriers from total 64 subcarriers, are used as BPSK (binary phase shift keying) ½ coding rate channel codes. According to this fact, in the communication system in accordance with the embodiment of the present invention, while 26 bits may be allocated to each OFDM symbol, only 24 bits may be allocated to each OFDM symbol by using only 48 data subcarriers as in the L-SIG 106 of the IEEE 802.11ac system.

For example, in the communication system in accordance with the embodiment of the present invention, as in the IEEE 802.11ac system, a W Hz bandwidth mode using 64 subcarriers, a 2 W Hz bandwidth mode using 128 subcarriers, a 4 W Hz bandwidth mode using 256 subcarriers and an 8 W Hz bandwidth mode using 512 subcarriers are basically present, and a W/2 Hz bandwidth mode using 32 subcarriers is additionally present. In this regard, while W=20 MHz is defined in the IEEE 802.11ac system, in the communication system in accordance with the embodiment of the present invention, a bandwidth is used by being changed so as to use a new frequency band different from that of the IEEE 802.11ac system. The bandwidth in the new frequency band is defined as W Hz.

In other words, in the communication system in accordance with the embodiment of the present invention, the VHT-SIG A1 206 and the VHT-SIG A2 208 for the W/2 bandwidth mode and the VHT-SIG A1 206 and the VHT-SIG A2 208 for the W Hz, 2 W Hz, 4 W Hz and 16 W Hz bandwidth modes are separately defined. In the communication system in accordance with the embodiment of the present invention, since the W Hz, 2 W Hz, 4 W Hz and 16 W Hz bandwidth modes are defined by defining the W Hz bandwidth mode using 64 subcarriers and then extending the W Hz bandwidth mode, the total numbers of the bits included in the VHT-SIG A1 206 and the VHT-SIG A2 208 are the same with each other. Therefore, in the communication system in accordance with the embodiment of the present invention, in the case of allocating two OFDM symbols to the VHT-SIG A1 206 and the VHT-SIG A2 208, total 52 bits or 48 bits are used to allocate control information.

Figure 4:
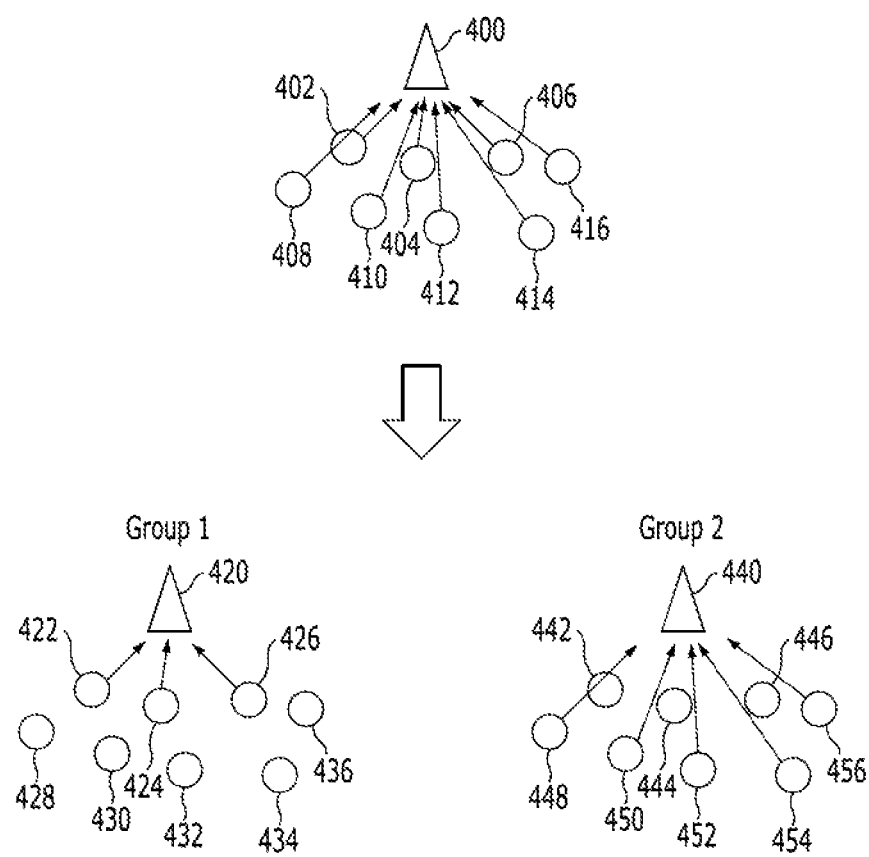
FIG. 4 is a diagram schematically showing the structure of a communication system in accordance with an embodiment of the present invention.

Also, in the communication system in accordance with the embodiment of the present invention, because subcarriers capable of being used in the W/2 Hz bandwidth mode are decreased to ½, the number of bits capable of being allocated to each OFDM symbol is limited. Namely, in the communication system in accordance with the embodiment of the present invention, as shown in FIG. 4, subcarriers are allocated according to the W Hz bandwidth mode using 64 subcarriers and the W/2 Hz bandwidth mode using 32 subcarriers. Since FIG. 4 will be described later in detail, concrete descriptions thereof will be omitted herein.

That is to say, in the communication system in accordance with the embodiment of the present invention, since a difference in the numbers of information bits capable of being allocated to the VHT-SIG A1 206 and the VHT-SIG A2 208 according to bandwidths is substantial, the OFDM symbol numbers and bit allocation schemes of the VHT-SIG A1 206 and the VHT-SIG A2 208 are made different according to bandwidths.

In detail, first, in the case of the W Hz bandwidth mode, in the communication system in accordance with the embodiment of the present invention, when assuming that two OFDM symbols are used as the VHT-SIG A1 206 and the VHT-SIG A2 208, bit allocation for the 48 bits or 52 bits of the VHT-SIG A1 206 and the VHT-SIG A2 208, that is, the information included in the VHT-SIG A1 206 and the VHT-SIG A2 208, is as follows.

MCS (modulation and coding scheme): 4 bits are needed (maximum 16 cases including 10 cases of the IEEE 802.11ac system and new MCSs, in which repetitive transmission is applied to a lowest transmission rate, are denoted).

Length (packet length): At least 10 bits are needed as the length is denoted by the unit of byte (denoted in a 2 byte or 4 byte type) or by the unit of OFDM symbol (an additional bit for solving the ambiguity of the last OFDM symbol is included). Here, 12 bits are needed in the case of the IEEE 802.11a system, 16 bits are needed in the case of the IEEE 802.11n system, and 17 bits are needed in the case of the IEEE 802.11ac system.

Guard interval (guard interval length): 2, 3 or 4 types are included in a regular GI type, a short GI type, and, as the occasion demands, a shorter GI type, and 1 bit or 2 bits are needed.

BW (bandwidth): 2 bits for denoting the W Hz, 2 W Hz, 4 W Hz and 8 W Hz bandwidth modes and 1 bit for denoting the W/2 Hz bandwidth mode are added. In the case of the W/2 Hz bandwidth mode, 1 bit may not be included in BW information for automatic detection using a preamble. 2 to 3 bits are needed.

STBC (space-time block code): 1 bit is needed to indicate whether STBCs are utilized or not.

Tail: 6 bits of 0 are inserted last.

Nsts (number of space-time streams): Maximum 4 as the number of data streams to be simultaneously transmitted using MIMO may be denoted, and 2 bits are needed.

Coding scheme: 1 bit is needed to select a convolution code and a low density parity check (LDPC) code.

TXOP-PS (power save using TXOP (transmission opportunity)): 1 bit is needed to denote selection according to whether TXOP-PS is utilized or not.

CRC: 8 bits are needed to perform CRC (cyclic redundancy check) for the VHT-SIG A1 206 and the VHT-SIG A2 208 (the number of bits may be changed through change of the coding rate of the CRC).

Reserved (reserved bit): Bits left after allocation are denoted by preset numbers at preset locations.

Further, in the communication system in accordance with the embodiment of the present invention, the contents used in the IEEE 802.11 system may be changed and other contents may be added. The following information is additionally included. That is to say, the information additionally included in the VHT-SIG A1 206 and the VHT-SIG A2 208 is as follows.

Application field and QoS (quality of service) requirements.

Aggregation.

Battery power warning.

Power level.

PSMP (power save multi-poll) group.

Warning signals.

A number of parameters associated with STA access.

In other words, in the communication system in accordance with the embodiment of the present invention, the VHT-SIG A1 206 and the VHT-SIG A2 208 constituted by 48 bits or 52 bits by combining bits as described above are transmitted during 2 OFDM symbols.

Moreover, in the W/2 Hz bandwidth mode, since total 24 bit allocation is possible in the case where only 2 OFDM symbols are allocated to the VHT-SIG A1 206 and the VHT-SIG A2 208, in the communication system in accordance with the embodiment of the present invention, only essential information is allocated as follows. That is to say, the essential information included in the VHT-SIG A1 206 and the VHT-SIG A2 208 is as follows.

MCS: 4 bits.

Length: 12 bits.

Tail: 6 bits.

Parity: 1 bit (error check is performed using parity, instead of CRC)

W/2 Hz BW (or GI): 1 bit. 1 bit may be allocated to identify the W/2 Hz bandwidth mode. Since automatic detection may be implemented using a preamble structure, a guard interval length is denoted instead.

In this way, in the communication system in accordance with the embodiment of the present invention, since only the essential information of 24 bits is allocated to the VHT-SIG A1 206 and the VHT-SIG A2 208, the number of OFDM symbols is increased to 3 or 4 in the case where information is additionally needed, so that the needed information is additionally allocated as in the W Hz bandwidth mode. Further, in the communication system in accordance with the embodiment of the present invention, in the case of the W/2 Hz bandwidth mode, the lengths of the VHT-SIG A1 206 and the VHT-SIG A2 208 may be made different from packet to packet, such that the amounts of the information included in the VHT-SIG A1 206 and the VHT-SIG A2 208 are made different from each other. In this regard, in order for a reception apparatus to verify the differences in the lengths of the VHT-SIG A1 206 and the VHT-SIG A2 208 and verify the extension of the VHT-LTFs 204, 210 and 212 in the case of using repetitive transmission, the VHT-SIG A1 206 and the VHT-SIG A2 208 are modified by combining Q-BPSK and BPSK and are then transmitted. According to this fact, the reception apparatus first discriminates the W/2 Hz bandwidth mode and the W Hz, 2 W Hz, 4 W Hz and 8 W Hz bandwidth modes from each other, verifies the VHT-SIG A1 206 and the VHT-SIG A2 208 in such a way as to correspond to such discrimination, detects the numbers of OFDM symbols used in the VHT-SIG A1 206 and the VHT-SIG A2 208 even in case of the W/2 Hz bandwidth mode, and extracts the information included in the VHT-SIG A1 206 and the VHT-SIG A2 208. Hereinbelow, a new frame structure in which a repetitive transmission scheme is considered in a communication system in accordance with an embodiment of the present invention will be described in detail with reference to FIG. 3.

Figure 3:
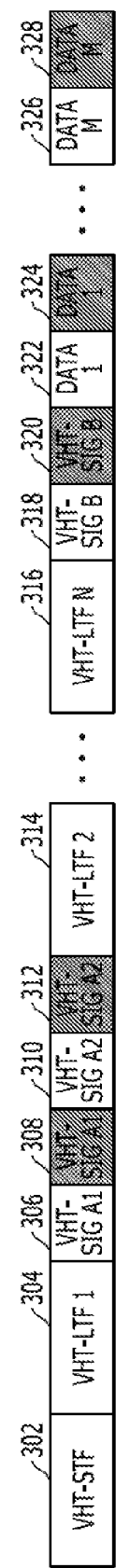

FIG. 3 is a diagram schematically showing a frame structure in a communication system in accordance with still another embodiment of the present invention. FIG. 3 is a diagram showing a new frame structure in which a repetitive transmission scheme is considered in the new frame structure for the new frequency band, shown in FIG. 2. Also, FIG. 3 is a diagram showing a new frame structure in which each of a VHT-SIG A1 and a VHT-SIG A2 includes 2 OFDM symbols and a 2× repetitive transmission scheme is exemplified.

Referring to FIG. 3, a frame in the new frequency band includes control fields in which control information for data transmission to and from a plurality of terminals is included, that is, a VHT-STF 302, two VHT-SIG A1s 306 and 308, two VHT-SIG A2s 310 and 312, a plurality of VHT-LTFs, that is, a VHT-LTF 1 304, a VHT-LTF 2 314 and a VHT-LTF N 316, and two VHT-SIG Bs 318 and 320 according to repetitive transmission, and includes a plurality of data fields as data fields in which data to be transmitted to the plurality of terminals are included, that is, two DATA 1s 322 and 324 and two DATA Ms 326 and 328.

The VHT-STF 302 is used in signal detection, automatic gain control, frequency error estimation, frame synchronization, and so forth, and the VHT-LTF 1 304 is used in channel estimation, frequency error estimation, and so forth. Also, the VHT-SIG A1s 306 and 308 and the VHT-SIG A2s 310 and 312 include information such as band widths, guard interval lengths, space-time codes, transmission rates (MCS levels), data stream numbers, AID information, a used coding technology, beamforming, and so forth.

Not only the VHT-LTF 1 304 but also the VHT-LTF 2 314 and the VHT-LTF N 316 are used in channel estimation, and the VHT-SIG Bs 318 and 320 include transmission rates (MCS levels) by user, for multi-user MIMO, data length information, and so forth. The DATA 1s 322 and 324 and the DATA Ms 326 and 328 include data which are to be actually transmitted to users, that is, STAs as terminals.

In the communication system in accordance with the embodiment of the present invention, in the case where a repetitive transmission scheme is considered, that is, a repetitive transmission mode is used, in the frame structure in the new frequency band shown in FIG. 2, not only a VHT-SIG A1 and a VHT-SIG A2 but also a VHT-SIG B repeat their respective previous symbols, that is, are consecutively repeated as in the frame structure shown in FIG. 3 and thus the two VHT-SIG A1s 306 and 308, the two VHT-SIG A2s 310 and 312 and the two VHT-SIG Bs 318 and 320 are included in the frame, and also, the data fields repeat their respective previous symbols, that is, are consecutively repeated and thus the two DATA 1s 322 and 324 and the two DATA Ms 326 and 328 are included in the frame. The consecutively repeated VHT-SIG A1s 306 and 308, VHT-SIG A2s 310 and 312, VHT-SIG Bs 318 and 320, DATA 1s 322 and 324 and DATA Ms 326 and 328 have the types of symbols which repeat their respective previous symbols, and are included in the frame through a variety of repetition schemes such as simple symbol repetition or repetition by changing the positions of subcarriers.

In the communication system in accordance with the embodiment of the present invention which uses the frame structure shown in FIG. 3, as reception sensitivity is improved, the length of the VHT-STF 302 is extended and thus signal detection performance in the reception apparatus is improved, and the lengths of the VHT-LTF 2 314 and the VHT-LTF N 316 are extended as well. Namely, as aforementioned above with reference to FIG. 2, the VHT-STF 302 is extended by the length of the L-STF 102 in the above-described frame of the IEEE 802.11ac system, and performs the function performed by the L-STF 102. Among the VHT-LTFs 304, 314 and 316, the VHT-LTF 1 304 as a first long training field is preferentially arranged at the front portion of the frame, that is, next to the VHT-STF 302, and the remaining N−1 number of VHT-LTFs 314 and 316 are arranged after the VHT-SIG A1s 306 and 308 and the VHT-SIG A2s 310 and 312. Hereinbelow, the structure of a communication system in accordance with an embodiment of the present invention will be described in detail with reference to FIG. 4.

FIG. 4 is a diagram schematically showing the structure of a communication system in accordance with an embodiment of the present invention.

Referring to FIG. 4, in the case where a plurality of terminals 402, 404, 406, 408, 410, 412, 414 and 416 are to simultaneously access one AP 400 through an available frequency band, for example, a new frequency band which is different from a frequency band used in an existing system, a communication system groups the plurality of terminals 402, 404, 406, 408, 410, 412, 414 and 416 into a predetermined number of terminal groups, for example, a first terminal group Group 1 and a second terminal group Group 2, to ensure that the plurality of terminals 402, 404, 406, 408, 410, 412, 414 and 416 simultaneously access the one AP 400 and normally transmit and receive data through the available frequency band, for example, the new frequency band. Further, the communication system causes the two terminal groups to alternately have a permission for channel use and causes only the terminals belonging to a corresponding group to access the one AP 400 in the CDMA scheme during a time in which the corresponding group has the permission for channel use.

APs corresponding to the terminal groups of the plurality of terminals 402, 404, 406, 408, 410, 412, 414 and 416 are configured. Namely, a first virtual AP 420, which performs the function of an AP corresponding to the first terminal group of the terminal groups, and a second virtual AP 440, which performs the function of an AP corresponding to the second terminal group of the terminal groups, are configured in the one AP 400. That is to say, the first virtual AP 420 corresponding to the first terminal group and the second virtual AP 440 corresponding to the second terminal group are included in the one AP 400. As aforementioned above, the virtual APs 420 and 440 are included in the one physical AP 400, and perform the same function as the one physical AP 400, in particular, the functions of administrating the terminal groups of the plurality of terminals 402, 404, 406, 408, 410, 412, 414 and 416. In other words, the virtual APs 420 and 440 mean APs which perform the functions of administrating the terminal groups.

The first virtual AP 420 and the second virtual AP 440, which are included in the one AP 400, use the available frequency band capable of being used by the one AP 400, that is, a channel allocated to the one AP 400, in such a way as to divide the channel in a time division scheme. Namely, by dividing the channel allocated to the one AP 400 in the time division scheme, the terminals included in the first terminal group access the first virtual AP 420 and transmit and receive data during a first time interval, and the terminals included in the second terminal group access the second virtual AP 440 and transmit and receive data during a second time interval.

In detail, first, when the plurality of terminals 402, 404, 406, 408, 410, 412, 414 and 416 access the one AP 400, the one AP 400 identifies terminal information of the plurality of terminals 402, 404, 406, 408, 410, 412, 414 and 416 and adjacent terminal information, determines the number of the terminal groups of the entire terminals, and informs terminal group information for the terminal groups to which the respective terminals are included, for example, virtual AP information of the virtual APs 420 and 440 which correspond to the respective terminal groups, to the plurality of terminals 402, 404, 406, 408, 410, 412, 414 and 416.

In order to allow the one AP 400 to determine the number of the terminal groups and group the plurality of terminals 402, 404, 406, 408, 410, 412, 414 and 416 into the terminal groups, that is, allocate the plurality of terminals 402, 404, 406, 408, 410, 412, 414 and 416 to corresponding terminal groups, the plurality of terminals 402, 404, 406, 408, 410, 412, 414 and 416 respectively transmit information for average amounts of data to be transmitted by themselves, service qualities in terms of maximally acceptable transmission delay, etc., that is, terminal information, to the AP 400 when they initially access the one AP 400. Also, the plurality of terminals 402, 404, 406, 408, 410, 412, 414 and 416 respectively transmit information such as addresses of adjacent terminals, reception power of signals received from the adjacent terminals, and so forth, that is, adjacent terminal information, to the AP 400 when they are initially accessed to the one AP 400. The AP 400 determines the terminal groups of the plurality of terminals 402, 404, 406, 408, 410, 412, 414 and 416 and performs grouping, by using the terminal information and the adjacent terminal information respectively received from the plurality of terminals 402, 404, 406, 408, 410, 412, 414 and 416.

Also, in the case of a sensor network or a smart utility network, sensor terminals or smart metering terminals transmit their terminal information to the AP 400 with a specified period. That is to say, the sensor terminals or the smart metering terminals transmit their data transmission periods and QoS parameters such as acceptable transmission delay ranges or importance of data, that is, priorities, to the AP 400 as the terminal information. The AP 400 groups the terminals into the terminal groups on the basis of the terminal information respectively received from the terminals, and determines and transmits the parameters of the terminal groups, that is, terminal group information.

For example, the AP 400 having respectively received the terminal information from the plurality of terminals 402, 404, 406, 408, 410, 412, 414 and 416 as described above sets terminals with similar transmission periods into the same terminal groups or controls a channel occupation authority, such as a channel occupation period or a channel occupation time, which is allocated to a corresponding terminal group, in consideration of transmission delay. Further, the AP 400 may maintain the same QoS of the terminals included in one terminal group, in such a way as to decrease the number of total terminals in the terminal group of a corresponding terminal, in the case where data importance is high.

That is to say, in the communication system in accordance with the embodiment of the present invention, the plurality of terminals 402, 404, 406, 408, 410, 412, 414 and 416 respectively transmit their terminal information, for example, QoS parameters, to the AP 400, and the AP 400 groups the plurality of terminals 402, 404, 406, 408, 410, 412, 414 and 416 into a plurality of terminal groups by using the terminal information respectively received from the plurality of terminals 402, 404, 406, 408, 410, 412, 414 and 416. The plurality of terminals 402, 404, 406, 408, 410, 412, 414 and 416 transmit the QoS parameters, that is, the terminal information, to the AP 400 by including the QoS parameters, that is, the terminal information, in access request control packets, when initially accessing the AP 400. In the case where the QoS parameters, that is, the terminal information is changed, the plurality of terminals 402, 404, 406, 408, 410, 412, 414 and 416 inform changed information of the QoS parameters, that is, the terminal information, to the AP 400 during signal transmission and reception intervals after an initial access. In order to transmit the changed information of the QoS parameters, that is, the terminal information, control fields are added to data packets such that the changed information of the QoS parameters can be transmitted.

In this way, in the communication system in accordance with the embodiment of the present invention, the one AP 400 receives the terminal information and the adjacent terminal information from the plurality of respective terminals 402, 404, 406, 408, 410, 412, 414 and 416, groups the plurality of terminals 402, 404, 406, 408, 410, 412, 414 and 416 into the first terminal group and the second terminal group, and configures the first virtual AP 420 corresponding to the first terminal group and the second virtual AP 440 corresponding to the second terminal group in itself, that is, includes the first virtual AP 420 and the second virtual AP 440 in the AP 400 itself. As described above, the first virtual AP 420 and the second virtual AP 440 are virtual APs which perform the functions of APs in the one physical AP 400, and the terminals included in the terminal groups of the first virtual AP 420 and the second virtual AP 440 respectively access the channel of the AP 400 through time division.

For example, terminals 422, 424 and 426 included in the first terminal group access the first virtual AP 420 during a first time interval in the channel of the AP 400 and transmit and receive data, and terminals 448, 450, 452, 454 and 456 included in the second terminal group access the second virtual AP 440 during a second time interval in the channel of the AP 400 and transmit and receive data. Also, terminals 428, 430, 432, 434 and 436 included in the first terminal group do not access the first virtual AP 420 during the first time interval, and terminals 442, 444 and 446 included in the second terminal group do not access the second virtual AP 440 during the second time interval.

In the communication system in accordance with the embodiment of the present invention, as described above, in order to ensure that a plurality of terminals access one AP and normally transmit and receive large data through a new frequency band, the plurality of terminals are grouped into terminal groups by using terminal information and adjacent terminal information received from the respective terminals, and virtual APs respectively corresponding to the terminal groups are configured in the one AP. Hereinbelow, transmission and reception of data within a service coverage of an AP in a communication system in accordance with an embodiment of the present invention will be described with reference to FIG. 5.

Figure 5:
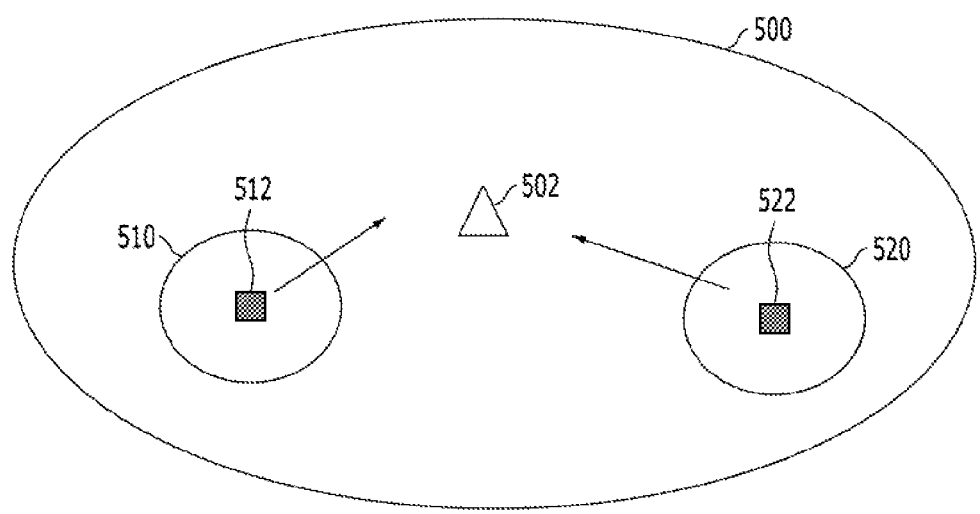
FIG. 5 is a diagram schematically showing data transmission within a service coverage of an AP in a communication system in accordance with an embodiment of the present invention.

FIG. 5 is a diagram schematically showing data transmission within a service coverage of an AP in a communication system in accordance with an embodiment of the present invention.

Referring to FIG. 5, a communication system includes an AP 502 which has a predetermined first service coverage 500, and terminals which transmit and receive data to and from the AP 502 within the first service coverage 500 of the AP 502, for example, a terminal 1 512 and a terminal 2 522.

The AP 502 has the first service coverage 500 which corresponds to the data transmission and reception area of the AP 502. The terminal 1 512 has a second service coverage 510 which corresponds to the data transmission and reception area of the terminal 1 512, and the terminal 2 522 has a third service coverage 520 which corresponds to the data transmission and reception area of the terminal 2 522.

The communication system in accordance with the embodiment of the present invention has service patterns in which a WLAN system is used in outdoor circumstances and one AP 502 covers a wide area. To this end, it is the norm that a plurality of antennas or an antenna with a high antenna gain is installed on the AP 502 and transmission power is set to be higher in comparison with the terminals 512 and 522. According to this fact, although the data transmission area of the AP 502 is widened and the reception capability of the AP 502 is improved, the data transmission and reception capabilities of the terminals 512 and 522 are markedly low in view of power consumption, etc. when compared to the AP 502. That is to say, the first service coverage 500 according to the wide data transmission and reception area of the AP 502 is larger than the second and third service coverages 510 and 520 according to the relatively small data transmission and reception areas of the terminals 512 and 522, and as a result, the above-described hidden node problem is likely to occur. The hidden node problem becomes serious as the number of terminals 512 and 522 present in the service coverage 500 of the AP 502 increases and the difference between the service coverage 500 of the AP 502 and the service coverages 510 and 520 of the terminals 512 and 522 increases. In particular, the hidden node problem becomes serious as the difference between the service coverages 500, 510 and 520 increases.

In detail, the AP 502 has the relatively large first service coverage 500 according to the wide data transmission and reception area, and the terminal 1 512 and the terminal 2 522 are present at positions which are geographically separated within the first service coverage 500. In the case where the data transmission and reception areas of the terminals 512 and 522 are smaller than the data transmission and reception area of the AP 502 and thus the service coverages 510 and 520 of the terminals 512 and 522 are smaller than the first service coverage 500 of the AP 502, although the transmission data of the AP 502 may be received by both the terminals 512 and 522 and both the transmission data of the terminals 512 and 522 may be received by the AP 502, the terminals 512 and 522 may not receive transmission data of each other, that is, the terminal 1 512 may not receive the transmission data of the terminal 2 522 and the terminal 2 522 may not receive the transmission data of the terminal 1 512.

Due to the characteristics of the CSMA/CA (carrier sense multiple access/collision avoid) protocol as a multiple access scheme of the WLAN system, in the case where the terminal 1 512 transmits data to the AP 502, the terminal 2 522 may not sense the data transmission of the terminal 1 512 to the AP 502 and may recognize as if a channel is empty. As a consequence, while the terminal 1 512 transmits data to the AP 502, the terminal 2 522 may transmit data of the terminal 2 522 itself to the AP 502. Accordingly, as a collision occurs between the two data transmitted from the terminal 1 512 and the terminal 2 522 to the AP 502, a hidden node problem may be caused in that the AP 502 may not receive both the data of the terminal 1 512 and the terminal 2 522.

Unlike the terminal 1 512 and the terminal 2 522, adjacent terminals, which are adjacent within the service coverage 500 of the AP 502 and of which data transmission and reception areas, that is, service coverages overlap, check data transmission of adjacent terminals through channel sensing, and accordingly, the above-described hidden node problem does not occur. Thus, in the communication system in accordance with the embodiment of the present invention, adjacent terminals of which service coverages overlap are grouped into one terminal group such that multiple accesses can be made in the CSMA/CA type competition scheme, that is, in the CSMA scheme, among terminals included in one terminal group, and different access times are allocated to terminal groups such that a data collision does not occur while transmitting data to the AP.

In the communication system in accordance with the embodiment of the present invention, in order to allow the AP to identify terminals which are geographically adjacent within the service coverage of the AP, as aforementioned above, terminals, which are positioned in the service coverage of the AP, transmit not only their terminal information but also adjacent terminal information, that is, information such as the addresses of adjacent terminals, reception power of the signals received from the adjacent terminals, and so forth, to the AP when they initially access the AP. In order for the terminals to transmit adjacent terminal information to the AP, although the terminals may transmit geographic information such as GPS information to the AP when the terminals access the AP or when the positions of the terminals are changed, since all of the terminals do not have geographic information, the terminals transmit the addresses of adjacent terminals, reception power of the signals received from the adjacent terminals, and so forth, to the AP as the adjacent terminal information, as described above.

In other words, in the communication system in accordance with the embodiment of the present invention, before a terminal transmits an association request frame to the AP, it reports information such as previously received addresses of adjacent terminals, reception power of the signals received from the adjacent terminals, and so forth, to the AP. In particular, in the case of the WLAN system as an example of the communication system, when a signal is received through a reception antenna, after each terminal demodulates the received signal and identifies a destination address, it determines whether or not the signal is a signal which is directed to it and determines whether to finally receive the signal. Further, the corresponding terminal has the reception power of the signals which adjacent terminals transmit to the AP or other terminals, as information in the type of RSSI (received signal strength indication) or RCPI (received channel power indication). According to this fact, the corresponding terminal transmits address information of adjacent terminals and reception power information of the adjacent terminals, that is, the adjacent terminal information, to the AP, by including it in the association request frame. In the case where a new address of an adjacent terminal is received or the reception power of an existing adjacent terminal is changed, the corresponding terminal transmits new address information of the adjacent terminal and changed reception power information of the adjacent terminal to the AP by including it in a data frame, and the AP updates a database through the information included in the data frame. If the AP periodically requests terminals that they update and transmit the addresses of adjacent terminals and the reception power information of the adjacent terminals, as a response to such a request, the terminals periodically update and transmit to the AP the addresses of adjacent terminals and the reception power information of the adjacent terminals.

In the communication system in accordance with the embodiment of the present invention, each terminal which transmits adjacent terminal information to the AP may transmit information of adjacent terminals to the AP by changing the number of the information. Namely, the corresponding terminal may transmit address information of adjacent terminals and reception power information of the adjacent terminals, that is, adjacent terminal information, which have been acquired through most recently received frames of the adjacent terminals, to the AP, and further, may transmit address information and reception power information of adjacent terminals which the corresponding terminal has extracted from N number of recent frames transmitted from adjacent terminals, to the AP. After the corresponding terminal arranges information corresponding to N number of recent frames in order of large reception power, it may transmit only M ($1 \leq M \leq N$) number of reception power information to the AP. Moreover, the corresponding terminal may transmit not only reception power information of adjacent terminals but also transmission power of the adjacent terminals and reception sensitivity of the corresponding terminal with respect to transmission data of the adjacent terminals, to the AP, and accordingly, the AP may predict whether the terminals are adjacent terminals and adjacency of the adjacent terminals.

For example, after the AP estimates distances between the corresponding terminal and the adjacent terminals through the reception power information of the adjacent terminals, and the transmission power and the reception sensitivity of the adjacent terminals, that is, estimates distances between the corresponding terminal and the adjacent terminals on the basis of transmission power of transmission ends and reception power of a reception end, the AP predicts, through the reception sensitivity, at which positions the adjacent terminals are present within the reception radius of the reception end, that is, predicts the positions of the adjacent terminals within the service coverage of the corresponding terminal.

Namely, in the communication system in accordance with the embodiment of the present invention, each terminal transmits the address information and power information received from adjacent terminals, that is, adjacent terminal information including address information of the adjacent terminals, transmission power information of the adjacent terminals and reception sensitivity of the corresponding terminal, as it is, to the AP through the association request frame, or lists adjacent terminal information and transmits the listed adjacent terminal information. After arranging adjacent terminals according to predetermined standards, for example, according to positions of the adjacent terminals and magnitudes of reception power, each terminal transmits lists for the address information and the power information of the arranged adjacent terminals, or transmits the address information and power information of predetermined adjacent terminals, for example, uppermost adjacent terminals, that is, uppermost adjacent terminal information, in the lists, to the AP. Hereinbelow, grouping of terminals present in a service coverage of an AP by using adjacent terminal information in a communication system in accordance with an embodiment of the present invention will be described in detail with reference to FIG. 6.

Figure 6:
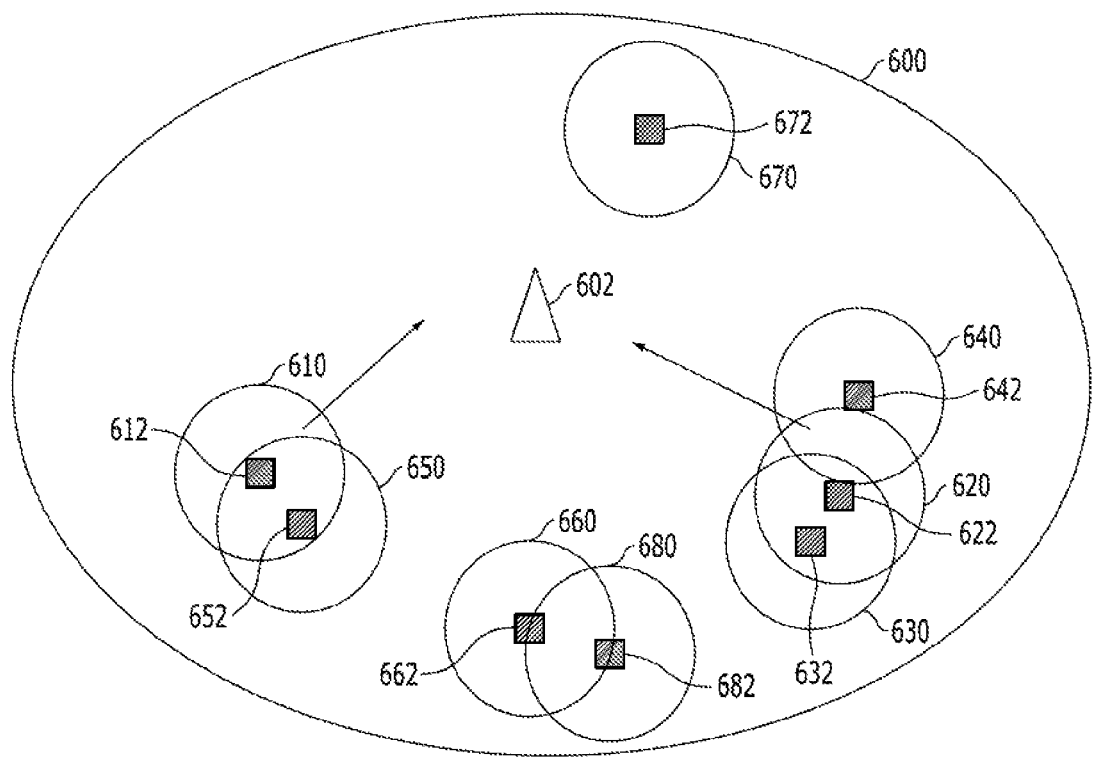
FIG. 6 is a diagram explaining grouping of terminals in a communication system in accordance with an embodiment of the present invention.

FIG. 6 is a diagram explaining grouping of terminals in a communication system in accordance with an embodiment of the present invention.

Referring to FIG. 6, a communication system includes an AP 602 which has a predetermined first service coverage 600, and a plurality of terminals 612, 622, 632, 642, 652, 662, 672 and 682 which transmit and receive data to and from the AP 602 within the first service coverage 600 of the AP 602.

The AP 602 has the first service coverage 600 which corresponds to the data transmission and reception area of the AP 602, and the plurality of terminals 612, 622, 632, 642, 652, 662, 672 and 682 have service coverages 610, 620, 630, 640, 650, 660, 670 and 680 which correspond to the data transmission and reception areas of the plurality of terminals 612, 622, 632, 642, 652, 662, 672 and 682.

As described above, all the terminals 612, 622, 632, 642, 652, 662, 672 and 682 which are present in the first service coverage 600 of the AP 602 transmit adjacent terminal information, that is, adjacent terminal information including address information of adjacent terminals of which service coverages overlap with the service coverages of the terminals, and transmission power, reception power and reception sensitivities of the adjacent terminals, to the AP 602 through association request frames. The AP 602 groups the terminals 612, 622, 632, 642, 652, 662, 672 and 682 which are present in the first service coverage 600 of the AP 602, into terminal groups by using the adjacent terminal information.

For example, in the case where the terminals 612, 622, 632, 642, 652, 662, 672 and 682 which are present in the first service coverage 600 corresponding to the data transmission and reception area of the AP 602 access the AP 602 sequentially from the first terminal 612 to the eighth terminal 682, since the first terminal 612 is a terminal which firstly accesses the AP 602, the first terminal 612 receives no frame from any frame in the first service coverage 600. Accordingly, the first terminal 612 accesses the AP 602 as it is, without transmitting adjacent terminal information including address information of an adjacent terminal and reception power information of the adjacent terminal. Since the second terminal 622 has no terminal which is present in the data transmission and reception area of the second terminal 622, that is, no adjacent terminal of which service coverage overlaps with the service coverage 620 of the second terminal 622, the second terminal 622 accesses the AP 602 as it is, without transmitting adjacent terminal information including address information of an adjacent terminal and reception power information of the adjacent terminal.

Since the third terminal 632 has a data transmission and reception area in which the second terminal 622 is present, that is, since the service coverage 630 of the third terminal 632 and the service coverage 620 of the second terminal 622 overlap, the third terminal 632 receives the frame transmitted from the second terminal 622, and accordingly, by regarding the second terminal 622 as an adjacent terminal, transmits adjacent terminal information including address information and reception power information of the second terminal 622, to the AP 602 through an association request frame. The reception power information represents high reception power as a quantized value is large by quantizing possible maximum reception power and possible minimum reception power, and as described above, not only the reception power information but also transmission power information and reception sensitivity of the adjacent terminal are transmitted by being included in the adjacent terminal information. Similar to the third terminal 632, since the service coverage 640 of the fourth terminal 642 and the service coverage 620 of the second terminal 622 overlap, by regarding the second terminal 622 as an adjacent terminal, the fourth terminal 642 transmits adjacent terminal information including address information and reception power information of the second terminal 622, to the AP 602 through an association request frame. Furthermore, as described above, the reception power information represents high reception power as a quantized value is large by quantizing possible maximum reception power and possible minimum reception power, and as described above, not only the reception power information but also transmission power information and reception sensitivity of the adjacent terminal are transmitted by being included in the adjacent terminal information.

By regarding the first terminal 612 as an adjacent terminal, the fifth terminal 652 transmits adjacent terminal information including address information and reception power information of the first terminal 612, to the AP 602 through an association request frame, and the sixth terminal 662 accesses the AP 602 as it is, without transmitting adjacent terminal information including address information of an adjacent terminal and reception power information of the adjacent terminal. Moreover, the seventh terminal 672 accesses the AP 602 as it is, without transmitting adjacent terminal information including address information of an adjacent terminal and reception power information of the adjacent terminal, and, by regarding the sixth terminal 662 as an adjacent terminal, the eighth terminal 682 transmits adjacent terminal information including address information and reception power information of the sixth terminal 662, to the AP 602 through an association request frame.

The AP 602, which has received the adjacent terminal information through the association request frames from the terminals 612, 622, 632, 642, 652, 662, 672 and 682 in this way, groups the terminals 612, 622, 632, 642, 652, 662, 672 and 682 into terminal groups through position-based grouping by using the adjacent terminal information. As described above, after the AP 602 identifies the positions of the terminals 612, 622, 632, 642, 652, 662, 672 and 682 within the first service coverage 600 by using the address information of the adjacent terminals, the reception power information of the adjacent terminals, and the transmission power and the reception sensitivity of the adjacent terminals included in the adjacent terminal information, the AP 602 groups the terminals 612, 622, 632, 642, 652, 662, 672 and 682 by grouping adjacent terminals into one terminal group, for examples, groups the first terminal 612 and the fifth terminal 652 into a first terminal group, groups the second terminal 622, the third terminal 632 and the fourth terminal 642 into a second terminal group, groups the sixth terminal 662 and the eighth terminal 682 into a third terminal group and groups the seventh terminal 672 into a fourth terminal group.

As described above, after the AP 602 estimates distances between the corresponding terminal and the adjacent terminals through the reception power information of the adjacent terminals and the transmission power and the reception sensitivity of the adjacent terminals, that is, estimates distances between the corresponding terminal and the adjacent terminals on the basis of transmission power of transmission ends and reception power of a reception end, the AP predicts, through the reception sensitivity, at which positions the adjacent terminals are present within the reception radius of the reception end, that is, predicts the positions of the adjacent terminals within the service coverage of the corresponding terminal.

As described above, the AP 602, which has identified the positions of the terminals 612, 622, 632, 642, 652, 662, 672 and 682 within the first service coverage 600 in this way by using the adjacent terminal information received from the terminals 612, 622, 632, 642, 652, 662, 672 and 682, groups adjacent terminals of the terminals 612, 622, 632, 642, 652, 662, 672 and 682 into terminal groups through position-based grouping. The AP 602 informs transmission possible times to terminals included in the respective terminal groups such that data of the respective terminals can be transmitted only at the transmission possible times. The AP 602 allocates different transmission possible times to the respective terminal groups such that the respective terminal groups can access the AP 602 and transmit and receive data to and from the AP 602 at the different transmission possible times and such that terminals included in one terminal group can access the AP 602 in the CSMA/CA competition scheme, that is, in the CSMA scheme, and transmit and receive data to and from the AP 602. Hereinbelow, allocation of transmission possible times to respective terminal groups in a communication system in accordance with an embodiment of the present invention will be described in detail with reference to FIG. 7.

Figure 7:
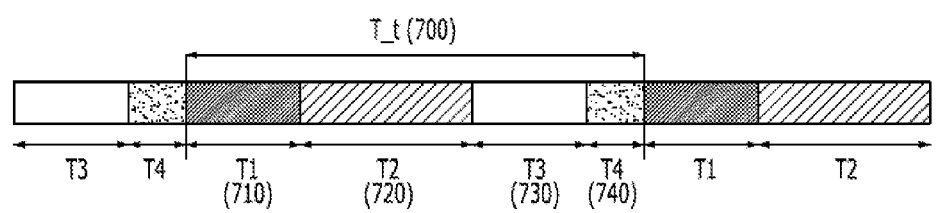
FIG. 7 is a diagram explaining allocation of transmission possible times in a communication system in accordance with an embodiment of the present invention.

FIG. 7 is a diagram explaining allocation of transmission possible times in a communication system in accordance with an embodiment of the present invention. FIG. 7 is a drawing schematically showing allocation of transmission possible times in the case where a plurality of terminals are grouped into 4 terminal groups as described above with reference to FIG. 6.

Referring to FIG. 7, in the communication system, after the positions of the terminals are identified within the service coverage of the AP by using the adjacent terminal information of the plurality of terminals as described above, in the case of grouping the terminals into the 4 terminal groups by adjacent terminals, through position-based grouping, different transmission possible times are allocated to the terminal groups.

That is to say, in the communication system, in a total transmission time T_t 700 of the terminals which are present within the service coverage of the AP, different transmission possible times are allocated to the terminal groups. Namely, in the total transmission time T_t 700, a first transmission possible time T1 710 is allocated to the first terminal group, a second transmission possible time T2 720 is allocated to the second terminal group, a third transmission possible time T3 730 is allocated to the third terminal group, and a fourth transmission possible time T4 740 is allocated to the fourth terminal group. The sizes of the time intervals of the transmission possible times 710, 720, 730 and 740 allocated to the respective terminal groups are determined in correspondence to the numbers of terminals included in the respective terminal groups as described above and terminal information received from the terminals, that is, subscription information of the respective terminals, data transmission cycles, transmission delays and service quality information indicating data priorities.

In other words, the sizes of the time intervals of the transmission possible times 710, 720, 730 and 740 allocated to the respective terminal groups may be controlled in proportion to the numbers of terminals included in the respective corresponding terminal groups, or the transmission possible times 710, 720, 730 and 740 may be allocated to have the same time interval regardless of the numbers of terminals included in the respective corresponding terminal groups.

In this way, in the communication system in accordance with the embodiment of the present invention, as different transmission possible times are allocated to the respective terminal groups and the transmission possible times are allocated to the terminals included in the corresponding terminal groups, the respective terminal groups may access the AP at the different transmission possible times to transmit and receive data, and terminals included in the same terminal group may make multiple accesses to the AP in the CSMA/CA competition scheme, that is, the CSMA scheme, at the transmission possible time corresponding to the terminal group in which they are included, to transmit and receive data. That is to say, in the communication system in accordance with the embodiment of the present invention, a data collision does not occur among the respective terminal groups upon access to the AP and upon transmission and reception of data, and multiple accesses are made in each terminal group in the CSMA/CA competition scheme, that is, the CSMA scheme. As a consequence, the above-described hidden node problem may be solved, and data can be normally transmitted and received between one AP and the plurality of terminals. Hereinbelow, transmission of transmission possible times to terminals included in respective terminal groups through transmission and reception of beacon frames in a communication system in accordance with an embodiment of the present invention will be described in detail with reference to FIG. 8.

Figure 8:
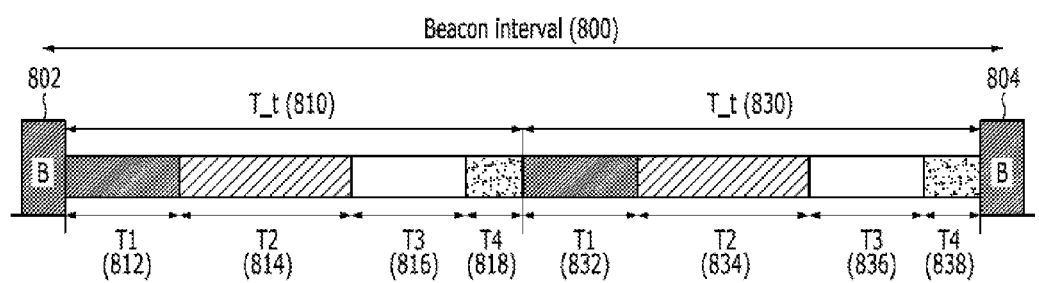
FIG. 8 is a diagram schematically showing transmission and reception of a beacon frame in a communication system in accordance with an embodiment of the present invention.

FIG. 8 is a diagram schematically showing transmission and reception of a beacon frame in a communication system in accordance with an embodiment of the present invention. FIG. 8 is a drawing schematically showing an example of transmitting the transmission possible times allocated to the respective terminal groups as described above with reference to FIG. 7, to the terminals included in the respective terminal groups, through beacon frames.

Referring to FIG. 8, in the communication system, the transmission possible times allocated to the respective terminal groups as described above are transmitted to the terminals which are included in the respective terminal groups, by using beacon frames 802 and 804. For example, after allocating the transmission possible times with different time intervals for the respective terminal groups, the AP of the communication system transmits the transmission possible times of the respective terminal groups to the terminals which are included in the respective terminal groups, by using the beacon frames 802 and 804 which are transmitted to the respective terminals with a preset cycle. The AP transmits information on start of data transmission when a transmission start time T_s lapsed and try of data transmission during a transmission time interval T_d after the beacon frames 802 and 804 are received. In other words, the AP transmits information on the transmission start time T_s and the transmission time interval T_d as the transmission possible times, to the terminals which are included in the respective terminal groups, through the beacon frames 802 and 804.

Namely, the AP transmits the beacon frames 802 and 804 including information of a beacon interval 800, information of a total transmission time T_t, information of the transmission start time T_s, information of the transmission time interval T_d and information of the terminal groups, to the terminals which are included in the respective terminal groups, so that the transmission possible times of the respective terminal groups can be transmitted to the terminals which are included in the respective terminal groups.

In detail, in the case where the AP allocates the transmission possible times to the 4 terminal groups as described above with reference to FIG. 7, through the beacon frames 802 and 804 and in the beacon interval 800 of the beacon frames 802 and 804, among the 4 terminal groups, it is notified to the terminals included in the first terminal group that transmission of data is to be tried during time intervals 812 and 832 of T1 immediately after the beacon frame 802 is received and when a total transmission time T_t 810 lapsed after the beacon frame 802 is received, it is notified to the terminals included in the second terminal group that transmission of data is to be tried during time intervals 814 and 834 of T2 when the time interval 812 of T1 lapsed after the beacon frame 802 is received and when the total transmission time T_t 810 plus the time interval 832 of T1 lapsed after the beacon frame 802 is received, it is notified to the terminals included in the third terminal group that transmission of data is to be tried during time intervals 816 and 836 of T3 when the time interval 812 of T1 plus the time interval 814 of T2 lapsed after the beacon frame 802 is received and when the total transmission time T_t 810 plus the time interval 832 of T1 plus the time interval 834 of T2 lapsed after the beacon frame 802 is received, and it is notified to the terminals included in the fourth terminal group that transmission of data is to be tried during time intervals 818 and 838 of T4 when the time interval 812 of T1 plus the time interval 814 of T2 plus the time interval 816 of T3 lapsed after the beacon frame 802 is received and when the total transmission time T_t 810 plus the time interval 832 of T1 plus the time interval 834 of T2 plus the time interval 836 of T3 lapsed after the beacon frame 802 is received. The transmission possible times of the respective terminal groups have different time intervals in the beacon interval of the beacon frames 802 and 804, and accordingly, the respective terminal groups access the AP at the different transmission possible times and transmit and receive data. The transmission possible times of the respective terminal groups including information on the total transmission time T_t 810 and 830, the transmission start time T_s and the transmission time interval T_d are transmitted through the beacon frames 802 and 804 in the beacon interval of the beacon frames 802 and 804.

In this way, in the communication system in accordance with the embodiment of the present invention, the AP transmits the different transmission possible times to the terminals which are included in the respective terminal groups, through the beacon frames. In particular, the respective terminal groups may access the AP at the different transmission possible times to transmit and receive data, and terminals included in the same terminal group may make multiple accesses to the AP in the CSMA/CA competition scheme, that is, the CSMA scheme, at the transmission possible time corresponding to the terminal group in which they are included, to transmit and receive data. Due to this fact, a data collision does not occur among the respective terminal groups upon access to the AP and upon transmission and reception of data, and multiple accesses are made in each terminal group in the CSMA/CA competition scheme, that is, the CSMA scheme. As a consequence, the above-described hidden node problem may be solved, and as a result, data can be normally transmitted and received between one AP and the plurality of terminals. Hereinbelow, a data transmission apparatus for transmitting and receiving beacon frames and data to and from terminals, that is, an AP, in a communication system in accordance with an embodiment of the present invention will be described in detail with reference to FIG. 9.

Figure 9:
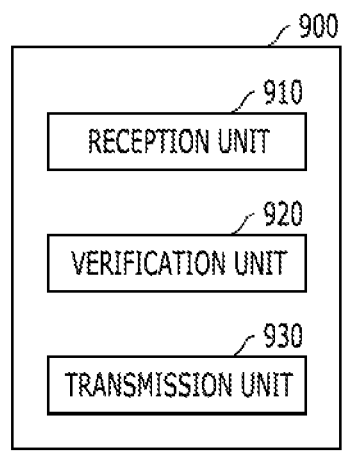
FIG. 9 is a diagram schematically showing the structure of a data transmission apparatus in a communication system in accordance with an embodiment of the present invention.

FIG. 9 is a diagram schematically showing the structure of a data transmission apparatus in a communication system in accordance with an embodiment of the present invention. FIG. 9 is a diagram schematically showing the structure of an AP which receives terminal information and adjacent terminal information from a plurality of terminals and transmits and receives beacon frames and data to and from the terminals as described above.

Referring to FIG. 9, a data transmission apparatus 900, that is, an AP, includes a reception unit 910 configured to receive terminal information and adjacent terminal information from a plurality of terminals which are to transmit and receive data through an available frequency band, for example, a new frequency band different from a frequency band used for transmitting and receiving data in an existing system, a verification unit 920 configured to verify the terminal information and the adjacent terminal information, in particular, the adjacent terminal information, received from the plurality of terminals and generate terminal groups of the plurality of terminals, and a transmission unit 930 configured to transmit beacon frames to the terminals included in the terminal groups.

The reception unit 910 receives terminal information and adjacent terminal information from a plurality of terminals which are to transmit and receive data through an available frequency band, for example, a new frequency band different from a frequency band used for transmitting and receiving data in the IEEE 802.11n system and the IEEE 802.11ac system as an existing WLAN system.

The verification unit 920 verifies the terminal information and the adjacent terminal information, in particular, the adjacent terminal information, received from the plurality of terminals and identifies positions of terminals which are present within a service coverage of the AP. Further, the verification unit 920 groups adjacent terminals into terminal groups through position-based grouping of the terminals and allocates transmission possible times to the terminal groups such that the terminal groups can have different time intervals in a beacon interval of beacon frames.

Moreover, the transmission unit 930 transmits the transmission possible times allocated to the respective terminal groups through the beacon frames, to the terminals included in the respective terminal groups. According to this fact, the respective terminal groups transmit and receive data by accessing the AP at different transmission possible times, and terminals included in one terminal group transmit and receive data by making multiple accesses to the AP in a CSMA/CA competition scheme, that is, a CAMA scheme, at a transmission possible time corresponding to the terminal group in which they are included. Since grouping of terminals present within a service coverage of an AP through adjacent terminal information, allocation of transmission possible times to terminal groups, transmission of the transmission possible times, transmission and reception of data among the terminal groups and among terminals included in the terminal groups at the transmission possible times have been described above in detail, concrete descriptions thereof will be omitted herein. Hereinbelow, operations in which an AP having received terminal information and adjacent terminal information from a plurality of terminals transmits beacon frames and data to the terminals in a communication system in accordance with an embodiment of the present invention will be described in detail with reference to FIG. 10.

Figure 10:
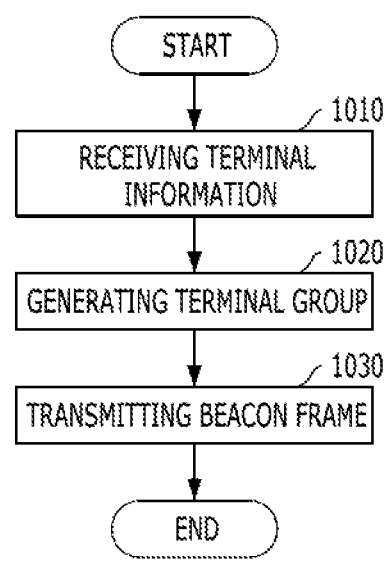
FIG. 10 is a diagram schematically showing a data transmitting procedure in the data transmission apparatus in a communication system in accordance with an embodiment of the present invention.

FIG. 10 is a diagram schematically showing a data transmitting procedure in the data transmission apparatus in a communication system in accordance with an embodiment of the present invention. FIG. 10 is a diagram schematically showing a procedure in which an AP having received terminal information and adjacent terminal information from a plurality of terminals transmits beacon frames and data as described above.

Referring to FIG. 10, in step 1010, as described above, a data transmission apparatus, that is, an AP, receives terminal information and adjacent terminal information from a plurality of terminals which are to transmit and receive data through an available frequency band, for example, a new frequency band different from a frequency band used for transmitting and receiving data in the IEEE 802.11n system and the IEEE 802.11ac system as an existing WLAN system.

In step 1020, the data transmission apparatus verifies the terminal information and the adjacent terminal information, in particular, the adjacent terminal information, received from the plurality of terminals and identifies positions of terminals which are present within a service coverage of the AP. Further, the data transmission apparatus groups adjacent terminals into terminal groups through position-based grouping of the terminals and allocates transmission possible times to the terminal groups such that the terminal groups can have different time intervals in a beacon interval of beacon frames.

In step 1030, the data transmission apparatus transmits the transmission possible times allocated to the respective terminal groups through the beacon frames, to the terminals included in the respective terminal groups. According to this fact, the respective terminal groups transmit and receive data by accessing the AP at different transmission possible times, and terminals included in one terminal group transmit and receive data by making multiple accesses to the AP in a CSMA/CA competition scheme, that is, a CAMA scheme, at a transmission possible time corresponding to the terminal group in which they are included. Since grouping of terminals present in a service coverage of an AP through adjacent terminal information, allocation of transmission possible times to terminal groups, transmission of the transmission possible times, transmission and reception of data among the terminal groups and among terminals included in the terminal groups at the transmission possible times have been described above in detail, concrete descriptions thereof will be omitted herein. Hereinbelow, a data reception apparatus for receiving beacon frames and data from an AP, that is, a terminal, in a communication system in accordance with an embodiment of the present invention will be described in detail with reference to FIG. 11.

Figure 11:
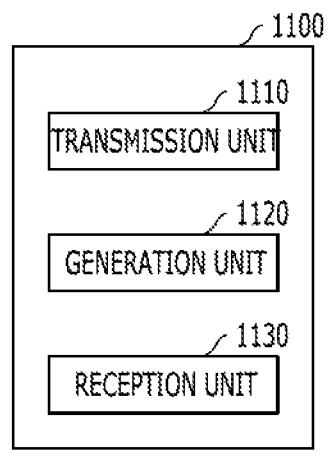
FIG. 11 is a diagram schematically showing the structure of a data reception apparatus in a communication system in accordance with an embodiment of the present invention.

FIG. 11 is a diagram schematically showing the structure of a data reception apparatus in a communication system in accordance with an embodiment of the present invention. FIG. 11 is a diagram schematically showing the structure of a terminal which receives beacon frames including data transmission possible times to one AP, from the AP as described above.

Referring to FIG. 11, a data reception apparatus 1100, that is, a terminal, includes a transmission unit 1110 configured to transmit terminal information and adjacent terminal information to an AP to transmit and receive data through an available frequency band, for example, a new frequency band different from a frequency band used for transmitting and receiving data in an existing system, a generation unit 1120 configured to generate the terminal information and the adjacent terminal information, and a reception unit 1130 configured to be included in a terminal group according to the terminal information and the adjacent terminal information, in particular, the adjacent terminal information, and receive beacon frames including transmission possible times corresponding to the terminal group, from the AP.

The generation unit 1120 generates terminal information of the terminal itself and adjacent terminal information in a new frequency band to transmit and receive data through an available frequency band, for example, a new frequency band which is used by the legacy devices for transmitting and receiving data in the IEEE 802.11n system and the IEEE 802.11ac system as an existing WLAN system, as aforementioned above.

The transmission unit 1110 transmits the terminal information and the adjacent terminal information to the AP upon an initial access to the AP. Also, the transmission unit 1110 transmits data by making multiple accesses to the AP at access possible times of the terminal group corresponding to it.

The reception unit 1130 receives beacon frames including transmission possible times to the AP corresponding to the terminal group in which the terminal itself is included, according to the terminal information and the adjacent terminal information. The reception unit 1130 receives data by making multiple accesses to the AP at an access possible time of the terminal group corresponding to it. Since generation and transmission of the adjacent terminal information, reception of the beacon frames including the transmission possible times to the AP corresponding to the terminal group, and transmission and reception of data among the respective terminal groups and among the terminals included in the respective terminal groups at the transmission possible times have been described above in detail, concrete descriptions thereof will be omitted herein. Hereinbelow, operations of receiving beacon frames and data from an AP in a communication system in accordance with an embodiment of the present invention will be described in detail with reference to FIG. 12.

Figure 12:
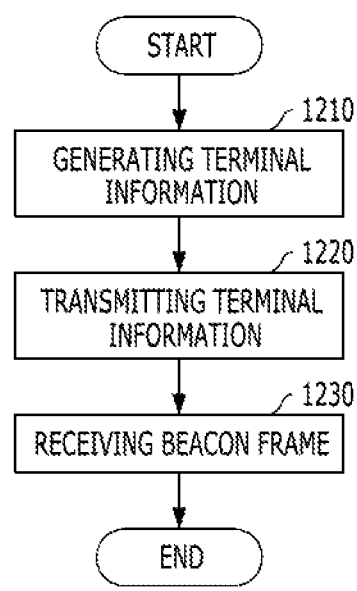
FIG. 12 is a diagram schematically showing a data receiving procedure in the data reception apparatus in a communication system in accordance with an embodiment of the present invention.

FIG. 12 is a diagram schematically showing a data receiving procedure in the data reception apparatus in a communication system in accordance with an embodiment of the present invention. FIG. 12 is a diagram schematically showing an operating procedure of a terminal which receives beacon frames including transmission possible times to one AP and data, from the AP.

Referring to FIG. 12, in step 1210, as described above, a data reception apparatus generates terminal information of the terminal itself and adjacent terminal information in a new frequency band to transmit and receive data through an available frequency band, for example, a new frequency band different from a frequency band used for transmitting and receiving data in the IEEE 802.11n system and the IEEE 802.11ac system as an existing WLAN system.

In step 1220, the data reception apparatus transmits the terminal information and the adjacent terminal information to the AP upon an initial access to the AP, and transmits data by making multiple accesses to the AP at access possible times of the terminal group corresponding to it.

In step 1230, the data reception apparatus receives beacon frames including transmission possible times to the AP corresponding to the terminal group in which the terminal itself is included, according to the terminal information and the adjacent terminal information. The reception unit 1130 receives data by making multiple accesses to the AP at an access possible time of the terminal group corresponding to it. Since generation and transmission of the adjacent terminal information, reception of the beacon frame including the transmission possible times to the AP corresponding to the terminal group, and transmission and reception of data among the respective terminal groups and among the terminals included in the respective terminal groups at the transmission possible times have been described above in detail, concrete descriptions thereof will be omitted herein.

As is apparent from the above descriptions, in the communication system in accordance with the embodiments of the present invention, in order to solve a hidden node problem of a WLAN system, a plurality of terminals are grouped into terminal groups through position-based grouping by using adjacent terminal information, and access times to an AP are differently allocated to the respective terminal groups. For example, as different time intervals are allocated to respective terminal groups in a beacon internal of beacon frames, occurrence of a collision among the terminal groups when accessing the AP and transmitting data is minimized. Further, terminals included in one terminal group make multiple accesses to the AP in a CSMA/CA competition scheme, that is, a CSMA scheme. As a consequence, even in the case where the WLAN system is used not only indoor but also outdoor, it is possible to prevent a network throughput from deteriorating due to the hidden node problem.

In the embodiments of the present invention, in a communication system, after the plurality of terminals are grouped into the terminal groups through position-based grouping and frames in a new frequency band are configured, beacon frames having beacon offsets and including information on data transmission possible times are transmitted and received to and from the plurality of terminals, by terminal groups, through the frames configured in this way. As a consequence, data can be normally transmitted and received to and from the plurality of terminals in the new frequency band while maintaining a quality of service.

While the present invention has been described with respect to the specific embodiments, it will be apparent to those skilled in the art that various changes and modifications may be made without departing from the spirit and scope of the invention as defined in the following claims.

What is claimed is:

1. A data transmission apparatus in a communication system, comprising:
   a reception unit configured to receive adjacent terminal information from a plurality of terminals through a frequency band for transmission and reception of data between the terminals and an access point (AP);
   a verification unit configured to identify distances between the terminals within a service coverage of the AP based on the adjacent terminal information to determine positions of the terminals, group the terminals into terminal groups through position-based grouping based on the positions of the terminals, and verify transmission possible times of the terminal groups to the AP; and
   a transmission unit configured to transmit information on the transmission possible times to the terminals included in the terminal groups using beacon frames,
   wherein, as the transmission possible times of the terminal groups, different time intervals are allocated in a beacon interval between the beacon frames.

2. The data transmission apparatus of claim 1, wherein the terminal groups access the AP during different time intervals, and transmit and receive data to and from the AP.

3. The data transmission apparatus of claim 1, wherein terminals included in a terminal group among the terminal groups make multiple accesses to the AP in a CSMA (carrier sense multiple access) scheme during a time interval which is allocated to said terminal group, and transmit and receive data to and from the AP.

4. The data transmission apparatus of claim 1, wherein the adjacent terminal information includes address information of adjacent terminals of which service coverages overlap with a service coverage of a first terminal among the terminals, and reception power information of the adjacent terminals.

5. The data transmission apparatus of claim 4, wherein the verification unit identifies distances between the first terminal and the adjacent terminals based on transmission power of the adjacent terminals and reception power of the first terminal in the reception power information of the adjacent terminals, and identifies positions of the adjacent terminals based on reception sensitivity of the first terminal in the reception power information of the adjacent terminals.

6. The data transmission apparatus of claim 1, wherein the verification unit groups terminals adjacent to each other among the terminals into one terminal group through the position-based grouping based on the positions of the terminals within the service coverage of the AP.

7. The data transmission apparatus of claim 1, wherein the transmission unit transmits total transmission time information, and transmission start time information and transmission time interval information of the respective terminal groups, to the terminals which are included in the terminal groups, using the beacon frames.

8. The data transmission apparatus of claim 1, wherein the reception unit receives the adjacent terminal information from terminals which initially access the AP using association request frames.

9. A data transmitting method in a communication system, the method comprising:
receiving adjacent terminal information from a plurality of terminals through a frequency band for transmission and reception of data between the terminals and an access point (AP);
identifying distances between the terminals within a service coverage of the AP based on the adjacent terminal information to determine positions of the terminals;
grouping the terminals into terminal groups through position-based grouping based on the positions of the terminals;
verifying transmission possible times of the terminal groups to the AP; and
transmitting information on the transmission possible times to the terminals included in the terminal groups using beacon frames,
wherein, as the transmission possible times of the terminal groups, different time intervals are allocated in a beacon interval between the beacon frames.

10. The method of claim 9, wherein the terminals of the terminal groups access the AP during different time intervals, and transmit and receive data to and from the AP.

11. The method of claim 9, wherein terminals included in a terminal group among the terminal groups make multiple accesses to the AP in a CSMA (carrier sense multiple access) scheme during a time interval which is allocated to said terminal group, and transmit and receive data to and from the AP.

12. The method of claim 9, wherein the adjacent terminal information includes address information of adjacent terminals of which service coverages overlap with a service coverage of a first terminal among the terminals, and reception power information of the adjacent terminals.

13. The method of claim 12, wherein said identifying includes:
identifying distances between the first terminal and the adjacent terminals based on transmission power of the adjacent terminals and reception power of the first terminal in the reception power information of the adjacent terminals; and
identifying positions of the adjacent terminals based on reception sensitivity of the first terminal in the reception power information of the adjacent terminals.

14. The method of claim 9, wherein said grouping includes grouping terminals adjacent to each other among the terminals into one terminal group through the position-based grouping based on the positions of the terminals within the service coverage of the AP.

15. The method of claim 9, wherein said transmitting includes transmitting total transmission time information, and transmission start time information and transmission time interval information of the respective terminal groups, to the terminals which are included in the terminal groups, using the beacon frames.

16. The method of claim 9, wherein said receiving includes receiving the adjacent terminal information from terminals which initially access the AP using association request frames.

17. A data reception apparatus in a communication system, comprising:
a generation unit configured to generate adjacent terminal information in a frequency band for transmission and reception of data between a plurality of terminals and an access point (AP);
a transmission unit configured to transmit the adjacent terminal information to the AP; and
a reception unit configured to receive information on a transmission possible time of a corresponding one of terminal groups using beacon frames, the transmission possible time being transmitted from the AP,
wherein the terminal groups are determined by grouping a plurality of terminals within a service coverage of the AP based on distances between the terminals that are identified based on adjacent terminal information provided by the terminals;
wherein, as transmission possible times of the terminal groups, different time intervals are allocated in a beacon interval between the beacon frames,
wherein the terminals of the terminal groups access the AP during different time intervals, and transmit and receive data to and from the AP, and
wherein terminals included in a terminal group among the terminal groups make multiple accesses to the AP in a CSMA (carrier sense multiple access) scheme during a time interval which is allocated to said terminal group, and transmit and receive data to and from the AP.

18. The data reception apparatus of claim 17, wherein the transmission unit transmits address information of adjacent terminals of which service coverages overlap with a service coverage of a first terminal among the terminals and reception power information of the adjacent terminals, as the adjacent terminal information, using association request frames.

19. A data receiving method in a communication system, the method comprising:
generating adjacent terminal information in a frequency band for transmission and reception of data between a plurality of terminals and an access point (AP);
transmitting the adjacent terminal information to the AP; and
receiving information on a transmission possible time of a corresponding one of terminal groups using beacon frames, the transmission possible time being transmitted from the AP,
wherein the terminal groups are determined by grouping a plurality of terminals within a service coverage of the AP based on distances between the terminals that are identified based on adjacent terminal information provided by the terminals;

wherein, as transmission possible times of the terminal groups, different time intervals are allocated in a beacon interval between the beacon frames, wherein the terminals of the terminal groups access the AP during different time intervals, and transmit and receive data to and from the AP, and wherein terminals included in a terminal group among the terminal groups make multiple accesses to the AP in a CSMA (carrier sense multiple access) scheme during a time interval which is allocated to said terminal group, and transmit and receive data to and from the AP.

20. The method of claim 19, wherein said transmitting includes transmitting address information of adjacent terminals of which service coverages overlap with a service coverage of a first terminal among the terminals and reception power information of the adjacent terminals, as the adjacent terminal information, using association request frames.

\* \* \* \* \*